Patented Nov. 20, 1951

2,575,376

UNITED STATES PATENT OFFICE 2,575,376

FORMYL CYCLOHEXENE NITRILES AND ESTERS

Donald T. Warner and Owen A. Moe, Minneapolis, Minn., assignors to General Mills, Inc., a corporation of Delaware No Drawing. Application October 21, 1949, Serial No. 122,850

3 Claims. (Cl. 260—464)

The present invention relates to cyclohexene compounds having the following formula and to a process of preparing the same:

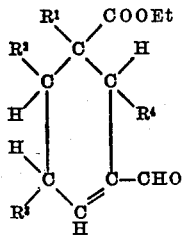

in which $R^1$ is selected from the group consisting of nitrile and COOEt, $R^2$, $R^3$, and $R^4$ are selected from the group consisting of hydrogen and methyl, and in which $R^2$ and $R^3$ are not both methyl, and $R^2$ and $R^4$ are hydrogen when $R^1$ is nitrile.

The products of the present invention are very highly functional and are of particular utility in organic synthesis. These aldehydo products may undergo the Knoevenagel condensation with other active methylene groups to yield new and interesting products.

These cyclohexene compounds are also alpha, beta-unsaturated aldehydes which may be used in 1,4 addition reactions with active methylene compounds to produce 1,3,4-trisubstituted cyclohexanes.

The cyclohexene aldehydo compounds themselves have a great stability and may be readily oxidized to the substituted cyclohexene carboxylic acids with air or other oxidizing agents. These substituted cyclohexene carboxylic acids may be hydrolyzed and decarboxylated to yield 1-cyclohexene-1,5-dicarboxylic acids or anhydrides.

The aldehydo group in the cyclohexene compounds may also undergo a wide variety of reactions without affecting the unsaturation of the ring. For example, the aldehydo group may be reacted with hydrogen cyanide to produce the cyanohydrin or the aldehydo group may be reduced with aluminum isopropylate to yield the unsaturated alcohol. Similarly, the double bond in the cyclohexenes may be reacted without affecting the aldehydo group or other groups present. For example, reduction of the cyclohexene compounds at approximately 30 lb. hydrogen pressure in the presence of a palladium on charcoal catalyst readily yields the substituted cyclohexanes corresponding to the formula

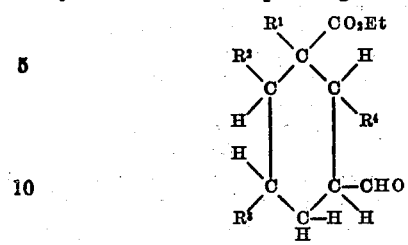

These compounds are also extremely stable and still retain the high functionality of the aldehydo group for further reaction.

It is therefore an object of the present invention to provide novel products having the above formula and to provide a process for producing them.

The products of the present invention may be prepared by the 1,4 addition of various alpha, beta-unsaturated aldehydes to unsubstituted malonic esters and unsubstituted cyanoacetic esters. The unsaturated aldehydes which the present invention contemplates include acrolein, methacrolein, and crotonaldehyde. The mechanism of the reaction appears to be as illustrated for the reaction between acrolein and ethyl malonate:

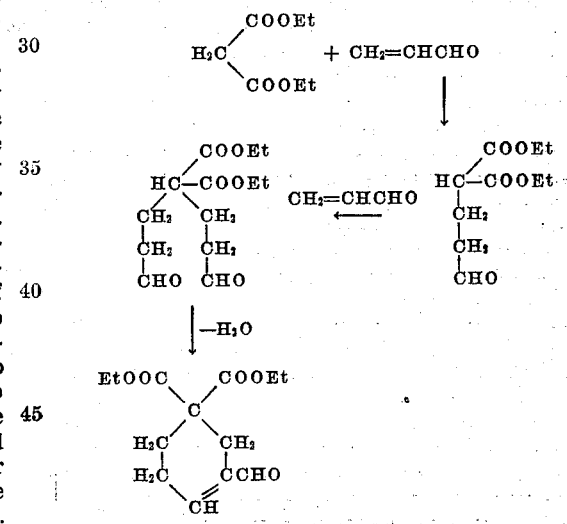

It will be apparent from these reactions that it is possible to use any of the aldehydes acrolein, methacrolein, or crotonaldehyde, with the exception that it is not possible to use two moles of methacrolein inasmuch as there must be one aldehyde group having two hydrogen atoms alpha to the carbonyl. There is apparently one further limitation in that it is not possible to use crotonaldehyde with cyanoacetic ester inasmuch as this condensation does not appear to result in a 1,4 addition. Considerable variation, however, is possible. For example, it is possible to use two moles of acrolein with either the cyanoacetic ester or the malonate ester. It is possible to use one mole of acrolein or crotonaldehyde with the malonate ester and to use one mole of methacrolein, acrolein, or crotonaldehyde for the second addition with the malonic ester. With the cyanoacetic ester it is possible to use a mole of acrolein for the first condensation and either a mole of acrolein or methacrolein for the second step of the condensation.

The products of the invention are all similar and differ from each other essentially in the presence or absence of a methyl group in the various positions, and also in the presence of a nitrile group in place of an ester group.

The addition reactions herein described are carried out in the presence of an alkaline catalyst, such as an alkali metal alkoxide, or in the presence of certain basic materials, such as tertiary amines, for example, tributyl amine. With the alkali metal alkoxide catalyst, the amount of catalyst is preferably held within the range of approximately 0.001 to 0.10 mole per mole of reagent used. Variations of catalyst outside this range may be employed, but in general, when the amount of catalyst exceeds the one-tenth mole ratio there is a tendency for side reactions which cut down the yield of the desired aldehyde and accordingly such higher molar ratios of catalyst are not preferred. With other catalysts, such as tributyl amine, the amount of catalyst is not as critical and it is possible to use much larger quantities of catalyst up to equi-molar proportions.

The reaction is carried out in the presence of a suitable solvent diluent which does not enter into the reaction. Almost any solvent diluent which meets this test may be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the amount of ester employed. In general, the larger the quantity of solvent employed, the easier it is to control the reaction in the desired direction. It is apparent that the quantity of solvent employed is limited by the problem of recovering the solvent.

The temperature employed during the addition reaction is subject to considerable change. Usually a temperature within the range of 0–50° C. is desirable. At temperatures above 50° C. there is a possibility of side reactions.

In carrying out the reaction it is preferred to prepare a solution of the malonic ester or the cyanoacetic ester in the solvent and to add the catalyst to this solution. The resultant solution is then cooled to a suitable temperature for reaction, and the 'unsaturated aldehyde is added slowly to the solution over an extended period of time. In this way it is possible to control the temperature of the reaction mixture very readily to within the desired range and thus to control the reaction in the desired direction. After the reaction has been completed the catalyst may be neutralized and the product worked up in a conventional manner.

The dialdehyde compounds shown as intermediates in the reaction are fairly stable compounds and may be isolated from the reaction mixture, for example by distillation. The cyclization of these dialdehydes appears to be promoted by elevated temperatures, and accordingly the conversion of the dialdehyde to the cyclicized aldehyde may be effected by effecting distillation of the reaction mixture at a higher pressure and consequently at a more elevated temperature.

*Example 1*

Five hundred cc. of absolute ethanol were mixed with 0.1 g. of metallic sodium. When all of the sodium had reacted, 128.1 g. of ethyl malonate were added and the resulting solution was cooled to 0° C. To this cold solution 43.9 g. of acrolein (containing 1% hydroquinone) were added dropwise over a period of 2½ hours. The acrolein was added at such a rate that the temperature could be maintained between 0–5° C. When the addition of the alpha,beta-unsaturated aldehyde was complete, the reaction mixture was stirred for an additional 5 hours at 0–5° C. The catalyst was then neutralized by the addition of 0.5 g. of glacial acetic acid. After the neutralization of the catalyst the reaction mixture was concentrated in vacuo to a rather viscous residue.

A small portion of this viscous residue was treated with 2,4-dinitrophenylhydrazine to yield the crude 2,4-dinitrophenylhydrazone which separated as an oily material. After rigorous purification by repeated crystallizations from absolute alcohol the pure 2,4-dinitrophenylhydrazone of gamma,gamma - dicarbethoxybutyraldehyde melted at 74–75° C.

Gamma,gamma - dicarbethoxybutyraldehyde was purified by distillation in the following manner. Six hundred cc. of benzene were added to the above viscous residue and the benzene solution washed with four 100 cc. portions of water. After the water washings the benzene solution was dried over anhydrous sodium sulfate. The sodium sulfate was removed by filtration and the clear benzene filtrate was concentrated in vacuo and the residual viscous oil distilled at a low pressure. The first fraction containing a small amount of diethyl malonate was discarded. The main fraction was collected over the range 98–105° C. at 0.2–0.3 mm. The residual oil remaining in the distillation flask possessed a light yellow color and began to decompose slightly at 105° C. at which time the distillation was interrupted.

The main fraction of the distillate was redistilled and the desired product was collected over the range 77–80° C. at 0.08 mm. An analytical sample prepared by a further distillation showed a boiling point at 75–76° C. at 0.07 mm. and $n_D^{25}$ 1.4345. The compound was further characterized by the preparation of the 2,4-dinitrophenylhydrazone which melted at 75–76° C.

216 g. of gamma,gamma-dicarbethoxybutyraldehyde prepared as above described were dissolved in 500 cc. of benzene and the catalyst (0.1 g. of sodium in 10 cc. of absolute ethanol) was added. The resulting solution was cooled to 5° C. and acrolein (56 g.) was added dropwise over a period of 90 minutes. The reaction temperature was maintained at 8° C. by means of external cooling. An additional quantity of catalyst (0.2 g. of sodium) was added. After stirring for an additional period of 2.5 hours, the reaction mixture was acidified with the requisite quantity of glacial acetic acid. The benzene solution was washed with water and after drying over anhydrous sodium sulfate the benzene was removed in vacuo. The residual oil was distilled at a pressure of approximately 3 mm. After three more distillations, the product was collected at 124–133° C. at 0.7 mm., $n_D^{25}$=1.4772.

Anal. calcd. for: $C_{13}H_{18}O_5$ _____ C, 61.41; H, 7.09
Found _____ C, 61.18; H, 7.39

The 2,4-dinitrophenylhydrazone was prepared in a conventional manner and after purification by crystallization from ethyl acetate it melted at 162–163° C.

Anal. calcd. for:
$C_{19}H_{22}O_8N_4$ _____ C, 52.53; H, 5.07; N, 12.90
Found _____ C, 52.90; H, 5.35; N, 13.13

The above cyclohexene derivative was reduced to the corresponding cyclohexane derivative in the following manner: 1-formyl-5,5-dicarbethoxycyclohexene (6.0 g.) was dissolved in 50 cc. of absolute ethanol and 0.5 g. of 5% palladium on charcoal was added. The reduction was carried out at an initial pressure of 34 pounds of hydrogen. After the reduction was complete the catalyst was removed by filtration and the alcoholic filtrate was used directly in the preparation of 2,4-dinitrophenylhydrazone of 1-formyl-5,5-dicarbethoxycyclohexane which melted at 141–142° C. after purification by crystallization from ethyl acetate.

Anal. calcd. for:
$C_{19}H_{24}O_8N_4$ _____ C, 52.3; H, 5.5; N, 12.84
Found _____ C, 52.4; H, 5.7; N, 12.97

*Example 2*

An alcoholic solution consisting of 200 parts of absolute ethanol and 0.04 part of metallic sodium and 45.5 parts of ethyl cyanoacetate was cooled to 0° C. Acrolein (23.3 parts) was added dropwise over a period of 75 minutes and the temperature was maintained at 0–3° C. The reaction mixture was stirred for an additional four-hour period and then placed in the refrigerator overnight. The alkaline catalyst was neutralized by the addition of 0.75 part of glacial acetic acid. After neutralization, the solution was concentrated in vacuo. The viscous oil thus obtained was dissolved in benzene and the benzene solution was concentrated in vacuo. The residual oil was subjected to fractional distillation under diminished pressure. The desired product was collected at 103–120° C. at 1.0 mm. This product was redistilled to yield the following fractions. Fraction (1) was collected at 47–82° C. at 0.08 mm., $n_D^{25}$ 1.4228, and fraction (2) was collected at 82° C. at 0.08 mm., $n_D^{25}$ 1.4430. Fraction (3) was collected at 82–84° C. at 0.08 mm., $n_D^{25}$ 1.4464, and fraction (4) was collected at 84–87° C. at 0.08 mm., $n_D^{25}$ 1.4482. Fraction (1) proved to be mostly ethyl cyanoacetate, whereas fractions 2, 3, and 4 contained mostly gamma-carbethoxy-gamma-cyanobutyraldehyde. The 2,4-dinitrophenylhydrazone was prepared in the usual manner and melted at 111.5 to 112° C. after purification by crystallization from aqueous alcohol.

The 1-formyl-5-carbethoxy-5-cyanocyclohexene was prepared from gamma-carbethoxy-gamma-cyanobutyraldehyde (29.5 g.) and acrolein (10.5 g.) employing benzene (80 cc.) as the solvent and sodium ethoxide (0.014 g. sodium) as the catalyst following the process of Example 1. Approximately 15% yield of the product was collected at 142–144° C. at 1.2 mm., $n_D^{30}$ 1.4698. The 2,4-dinitrophenylhydrazone melted at 209–210° C. after crystallization from ethyl acetate.

Anal. calcd. for:
$C_{17}H_{17}O_6N_5$ _____ C, 52.72; H, 4.39; N, 18.1
Found _____ C, 52.66; H, 4.43; N, 18.22

This same product is obtained when ethyl cyanoacetate is treated with two molar equivalents of acrolein under similar reaction conditions.

The low pressure reduction of this compound to 1-formyl-5-carbethoxy - 5 - cyanocyclohexane proceeded smoothly in the presence of 5% palladium on charcoal when previously described conditions were employed. This latter cyclohexane derivative was identified as the 2,4-dinitrophenylhydrazone which melted at 125–126° C.

Anal. calcd. for:
$C_{17}H_{19}O_6N_5$ _____ C, 52.44; H, 4.88; N, 17.99
Found _____ C, 52.30; H, 5.06; N, 18.23

Various modifications of the invention have been described, but it is understood that other modifications are possible without departing from the spirit thereof.

We claim as our invention:
1. Cyclohexene compounds having the formula

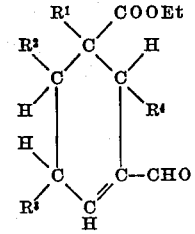

in which $R^1$ is selected from the group consisting of CN and COOEt, $R^2$, $R^3$ and $R^4$ are selected from the group consisting of hydrogen and methyl, and $R^2$ and $R^3$ are not both methyl, and $R^2$ and $R^4$ are hydrogen when $R^1$ is CN.

2. 1-formyl-5,5-dicarbethoxy cyclohexene.
3. 1-formyl-5-carbethoxy-5-cyano cyclohexene.

DONALD T. WARNER.
OWEN A. MOE.

REFERENCES CITED

The following references are of record in the file of this patent:

UNITED STATES PATENTS

| Number | Name | Date |
|--------|------|------|
| 2,228,256 | Christiansen | Jan. 14, 1941 |
| 2,264,354 | Alder | Dec. 2, 1941 |

OTHER REFERENCES

Wichterle, Chem. Abstracts, vol. 39, column 1841 (1945).